United States Patent [19]

Gleason et al.

[11] Patent Number: 5,416,918
[45] Date of Patent: May 16, 1995

[54] LOW SKEW SYSTEM FOR INTERFACING ASICS BY ROUTING INTERNAL CLOCK OFF-CHIP TO EXTERNAL DELAY ELEMENT THEN FEEDING BACK TO ON-CHIP DRIVERS

[75] Inventors: Craig A. Gleason; Robert J. Horning, both of Fort Collins, Colo.

[73] Assignee: Hewlett-Packard Company, Palo Alto, Calif.

[21] Appl. No.: 187,264

[22] Filed: Jan. 27, 1994

Related U.S. Application Data

[63] Continuation of Ser. No. 727,894, Jul. 10, 1991, abandoned.

[51] Int. Cl.[6] .............................. G06F 1/04; G06F 1/10
[52] U.S. Cl. ....................... 395/550; 364/270; 364/271.5; 364/DIG. 1
[58] Field of Search ............... 395/325, 550; 307/443, 307/263, 480; 364/400, 489; 371/25; 340/825.14; 328/55, 56; 375/106

[56] References Cited

U.S. PATENT DOCUMENTS

| | | | |
|---|---|---|---|
| 4,255,789 | 3/1981 | Hartford et al. | 364/431 |
| 4,497,056 | 1/1985 | Sugamori | 371/25 |
| 5,040,109 | 8/1991 | Bowhill et al. | 395/325 |
| 5,133,064 | 7/1992 | Hotta et al. | 395/550 |
| 5,164,619 | 11/1992 | Luebs | 307/480 |

OTHER PUBLICATIONS

"CMOS PA-RISC Processor For a New Family of Workstations", by M. Forsyth et al., (IEEE COMPCOM Spring '91 Digest of Papers; Feb. 1991.

"System Design for a Low Cost PA-RISC Desktop Workstation", by R. Horning et al., (IEEE COMPCOM Spring '91 Digest of Papers; Feb. 1991.

"Architecture and Compiler Enhancements for PA-RISC Workstations", by D. Odnert et al., (IEEE COMPCOM Spring '91 Digest of Papers; Feb. 1991.

Chengsen et al., "A Dynamically Tracking Clock Distribution Chip with Skew Control", IEEE 1990 Custom Integrated Circuits Conference, pp. 15.6.1–15.6.4.

Itoh et al., "A Novel Design Concept for Small Skew Clock LSI with the Self-Delay-Adjustment ", IEEE 1991 Bipolar Circuits & Technology Meeting, pp. 130–133.

Johnson et al. "A Variable Delay Line PLL for CPU–Coprocessor Synchronization" IEEE Journal of Solid–State Circuits, vol. 23, No. 5, Oct. 1988, pp. 1218–1223.

*Primary Examiner*—Thomas C. Lee
*Assistant Examiner*—D. Dinh

[57] ABSTRACT

A low skew interface system for enabling an ASIC chip's receivers to latch information from one or more buses. The interface comprises a driver circuit connected to an internal clock of the chip for generating another clock signal with phase different from the phase of the internal clock. A delay element is located off the chip and connected to the driver circuit for delaying the clock signal, thereby generating a latch clock signal. The latch clock signal is sent back on-chip to enable the receivers to transfer information from one of the buses to the chip.

19 Claims, 6 Drawing Sheets

LOW SKEW SYSTEM FOR INTERFACING ASICS BY ROUTING INTERNAL CLOCK OFF-CHIP TO EXTERNAL DELAY ELEMENT THEN FEEDING BACK TO ON-CHIP DRIVERS

CROSS REFERENCE TO RELATED APPLICATION

This is a continuation of application Ser. No. 07/727,894 filed on Jul. 10, 1991, now abandoned.

DESCRIPTION

1. Technical Field

The field of the invention relates to a low skew system for interfacing application specific integrated circuits, and in particular to a latch clock driver system for generating a latch clock based on an internal clock using an off-chip delay. Latch clock signals are generated by the system to qualify information at on-chip receivers.

2. Background Art

Many application specific integrated circuits (ASICs) must communicate with one or more system buses in order to receive and transmit information in the form of data, addresses, and control signals to perform various tasks. In both synchronous and asynchronous systems, ASICs include on-chip receivers for transferring information from the buses to the chip. ASICs also typically include on-chip drivers which are used to transfer information (e.g., addresses and data), from the chip to the buses.

An example of a computer system comprising ASIC circuits and buses is shown in FIG. 1. A computer system 100 includes a central processor unit (CPU) 102, a data cache memory 104, a bidirectional data bus 106 and a unidirectional address bus 110.

When the CPU 102 requires information in the form of data from the data cache memory 104, an address is sent to the data cache 104 via the address bus 110. The CPU 102 includes an address driver 112 for placing the appropriate address on the address bus 110 for transfer to the data cache memory 104. The data cache memory 104 will then transfer data back to the CPU 102 via the data bus 106. A receiver 108 at the CPU 102 will then latch the incoming data from the data bus 106 based on the leading edge of a qualification signal, shown in FIG. 1 as a clock signal CK. Data is transferred from the CPU 102 to the data cache 104 over the databus 106 using an on-chip data driver 114. The complete cache access time (counting address drive time, receiver setup time, etc.), is equal to the CPU cycle time.

The data is latched one clock cycle after the corresponding address is set-up on the address bus 110. The timing of the clock signal must be chosen to correspond to the timing of the static random access memory (SRAM) chips which comprise the data cache memory 104. This system illustrates the interdependency of the clock timing to the actual SRAM employed in the data cache memory. The data cache memory and CPU are only two examples of ASICs which communicate via buses.

DISCLOSURE OF THE INVENTION

The low skew system and method of the present invention enable an ASIC chip's receivers to latch information from one or more buses. The interface comprises a driver circuit connected to an internal clock of the chip for generating another clock signal with phase different from the phase of the internal clock. A delay element is located off the chip and connected to the driver circuit for delaying the clock signal, thereby generating a latch clock signal. The latch clock signal is sent back on-chip to enable the receivers to transfer information from one of the buses to the chip. The driver circuit may also include an output pad for transferring the clock signal to the delay element, an invertor for inverting the internal clock a pull-up transistor, controlled by the output of the invertor, for connecting the pad to a first voltage level when the internal clock is in a first logic state, and a pull-down transistor, controlled by the internal clock, for connecting the pad to a second voltage level when the internal clock is in a second logic state.

The system may further include a plurality of driver circuits and delay elements. The driver circuits are connected to the internal dock for generating a plurality of clock signals each with a phase different from the phase of the internal clock. The delay elements are located off the chip. Each delay element is connected to one of the plurality of driver circuits for delaying the respective clock signal thereby generating a plurality of latch clock signals. The latch dock signals are used to enable the receivers to transfer information from the buses to the chip.

BRIEF DESCRIPTION OF THE DRAWING

The invention will be better understood if references to the accompanying drawings in which.

BEST MODE FOR CARRYING OUT THE INVENTION

An overall system which incorporates the present invention is generally described in an article by M. Forsyth et al. titled, "CMOS PA-RISC Processor For a New Family of Workstations," *IEEE COMPCOM Spring '91 Digest of Papers*, February 1991. The environment described in this article is only one of many computer systems in which the present invention could be used. This article includes non-essential material for carrying out the present invention and is incorporated herein by reference as if set forth below in full.

The low skew system and method for interfacing ASICs of the present invention (the present invention) will now be discussed with reference to FIG. 2-6.

Figure 1:
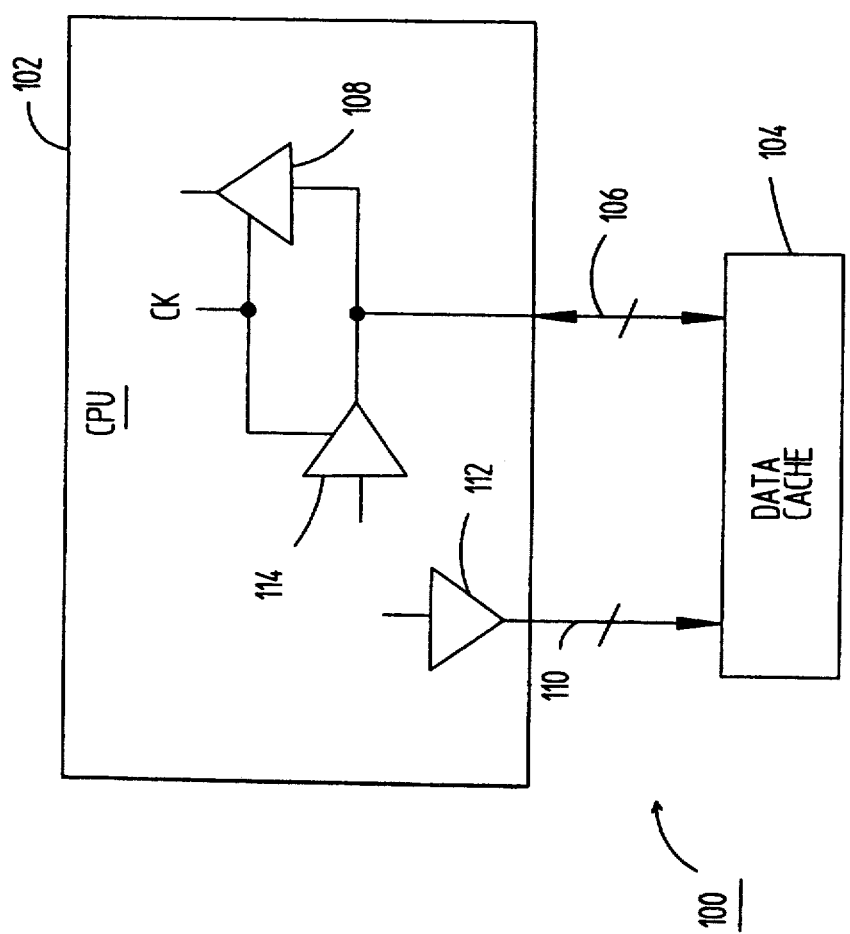
FIG. 1 shows a computer system employing conventional receiver latch clock timing.
Figure 2:
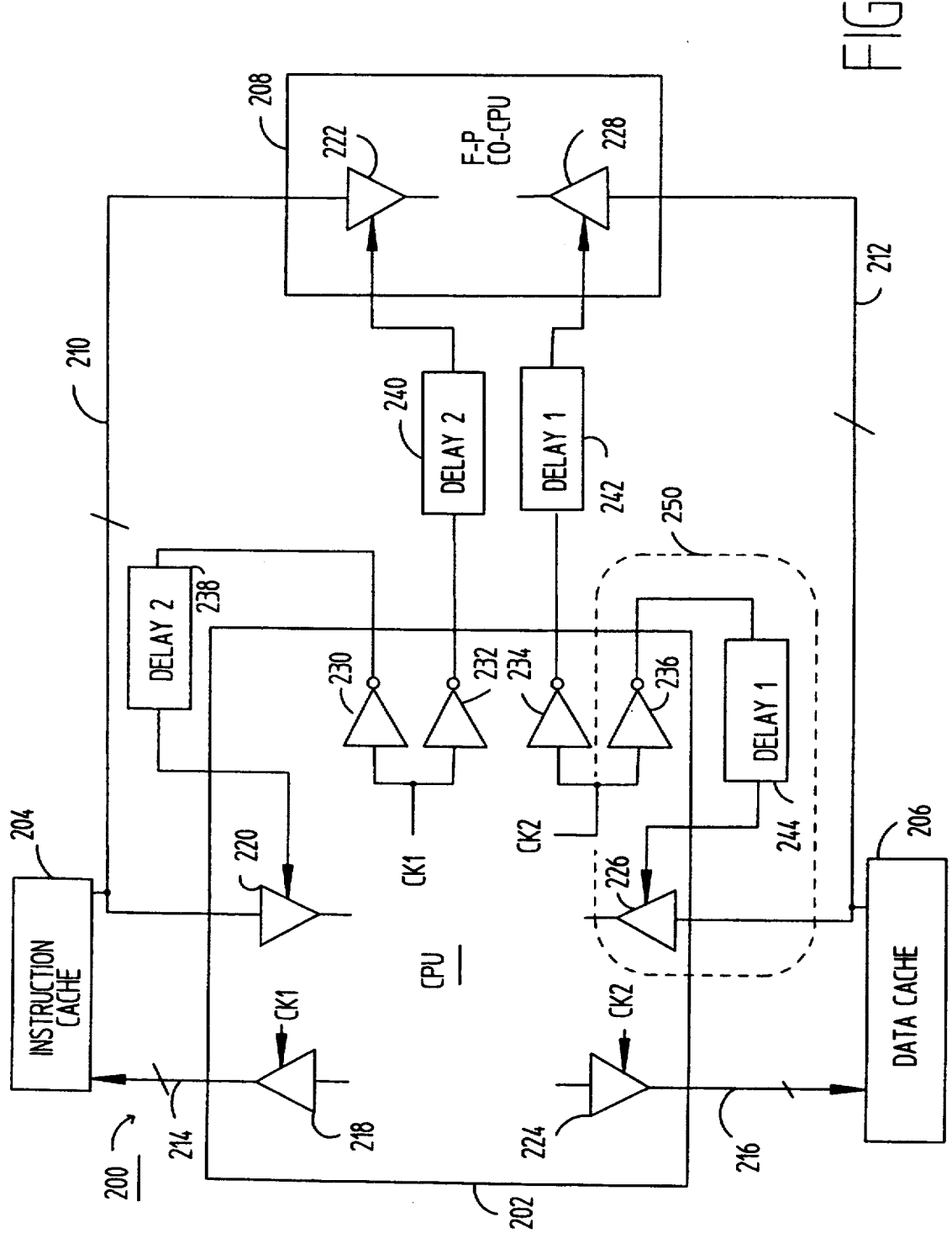
FIG. 2 shows a computer system employing an off-chip latch clock delay in conjunction with the present invention.

Turning now to FIG. 2, an example computer system employing the present invention will now be discussed. FIG. 2 shows a computer system 200 comprising a CPU 202, an instruction case memory 204, a data cache memory 206 and a floating point co-processor 208. Instructions are transmitted between the CPU 202, instruction cache memory 204 and the floating point co-processor 208 via an instruction bus 210. The width of the instruction bus 210 is application specific and is governed by the system architecture. Similarly, a data bus 212 is used to communicate data between the CPU 202, the data cache memory 206 and the floating point co-processor 208. The use of the floating point co-processor 208 and width of the data bus 212 are also application specific and will depend on the specific architecture used for the computer system, as will become evident to those of ordinary skill in the art. An instruction address bus 214 and a data address 216 are also shown in the FIG. 2.

In order to execute a particular instruction, the CPU 202 will place an address on the instruction address bus 214 using an address driver 218. The instruction cache 204 will then place the corresponding instruction on the instruction bus 210 for communication back to the CPU 202 via an on-chip instruction receiver 220. For illustration, only one instruction receiver 220 is shown in the figure. However, there will be an instruction receiver for each bit corresponding to the width of the instruction bus 210. The floating point co-processor 208 also includes an instruction receiver(s), as shown at 222.

In general, the CPU retrieves data from the data cache memory 206 in a similar fashion to the instruction retrieval discussed above. The CPU will place an address on the data bus 216 using a data address driver 224. In turn, the data cache memory 206 will transfer the corresponding data onto the data bus 212. This data is transferred to the CPU via on-chip data receiver(s) 226. The floating point co-processor 208 also includes a data receiver(s), as shown at 228.

The qualifying of information received by the CPU and floating point coprocessor from the instruction bus 210 and data bus 212 is accomplished via on-chip latch clock drivers 230, 232, 234, and 236. Off-chip delay elements 238, 240, 242 and 244 are used in conjunction with the latch clock drivers 230-236 to create latch clock signals for enabling the receivers to latch information from a corresponding bus.

The delay element 244, its corresponding latch clock driver 236 and the receiver 226 which they enable, are shown in a dashed box 250. The off-chip delay element 244 and the latch clock driver 236 represent a single low skew interface in conjunction with the present invention.

Because the delay element of the present invention is off-chip, it can be used to fine tune the latch clock delay with relative ease. Conventional clocks delays are generated by elements directly on CPU's VLSI chip. The amount of delay can therefore not be changed. Alternatively, systems with clocks generated off-chip must buffer the clock using off-the-shelf TTL and ECL fan-out buffers, for example. Such systems also tune the off-chip generated clock using off-chip delay lines. The net result is increased skew between any two clocks, because at the fanout stage each clock may be faster or slower the others. In the present invention, the first clock (i.e., the clock used to drive addresses) is fixed, because its skew verses any previous clock is irrelevant; only the clocks sent off chip and delayed will have skew.

One major advantage of the off-chip delay of the present invention is the ability to change the latch clock timing to permit cache SRAM replacement or upgrades. For example, different model SRAMs will typically have different minimum access times. The latching of data from cache memories can therefore be optimized to match the speed of the SRAMs employed in the cache.

For the purpose of discussion, the system shown in FIG. 2 is based on a specific pipeline architecture that permits data and instruction accesses on opposite clock cycles (see CK1 and CK2 of FIG. 2). The system is one of many systems that could benefit from the present invention. Therefore it is explained by way of example, not limitation. Those of ordinary skill in the art will readily envision other CPU architectures or interconnected ASICs, for example, that would also benefit from the present invention. The timing system for the instruction and data caches is essentially identical, apart from the fact that they work on opposite clock cycles. Hence, they can be considered to be separate.

The instruction and data caches 204,206 are configured using industry standard "15 ns" SRAMs, which have a 4 ns data hold time and standard TTL I/O levels. An alternative embodiment having only a single cache memory would require only one delay element (i.e., only one low skew interface).

The floating point co-processor 208 could be any chip that needs to look at the cache data and have the same timing relationship as the CPU. The floating point chip 208 is not necessary to carry out the present invention. It is only included as an example of another device requiring bus access and latch clock timing. Without the floating point chip only two delay elements would be required: one for each cache memory.

The CPU of the present example has an internal clock (CK) running at 50 mega-hertz (Mhz), with a cycle time (see 310 at FIG. 3) of 20 nanoseconds (ns), (i.e., CK rising to the next CK rising). The opposite clock cycles, noted above as CK1 and CK2, are 180 degrees out of phase.

Turning now to the operation of the present invention, a timing diagram for the system in FIG. 2 will be described with reference to FIG. 3.

Figure 3:
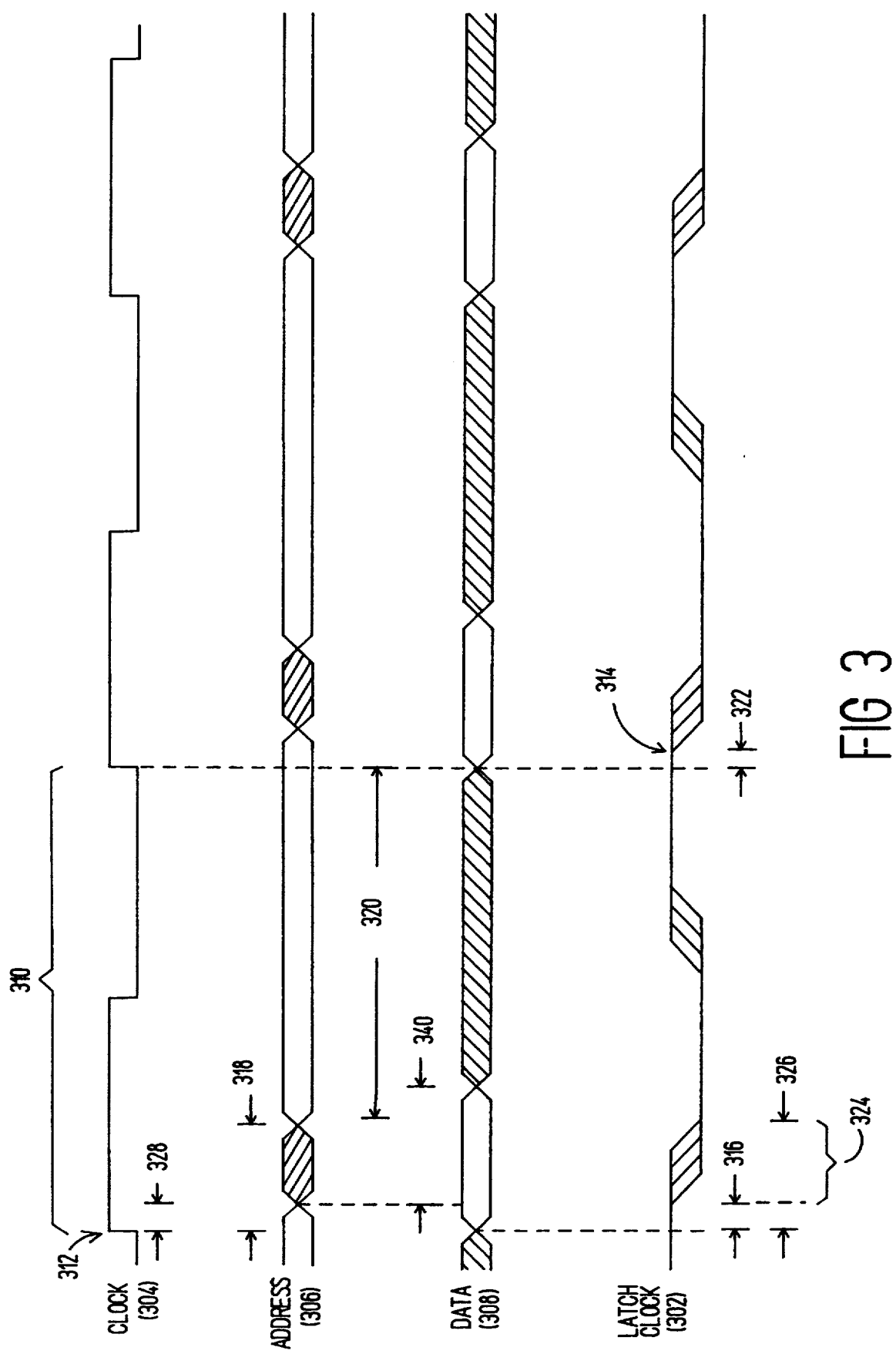
FIG. 3 shows a timing sequence for the computer system of FIG. 2.
Figure 4:
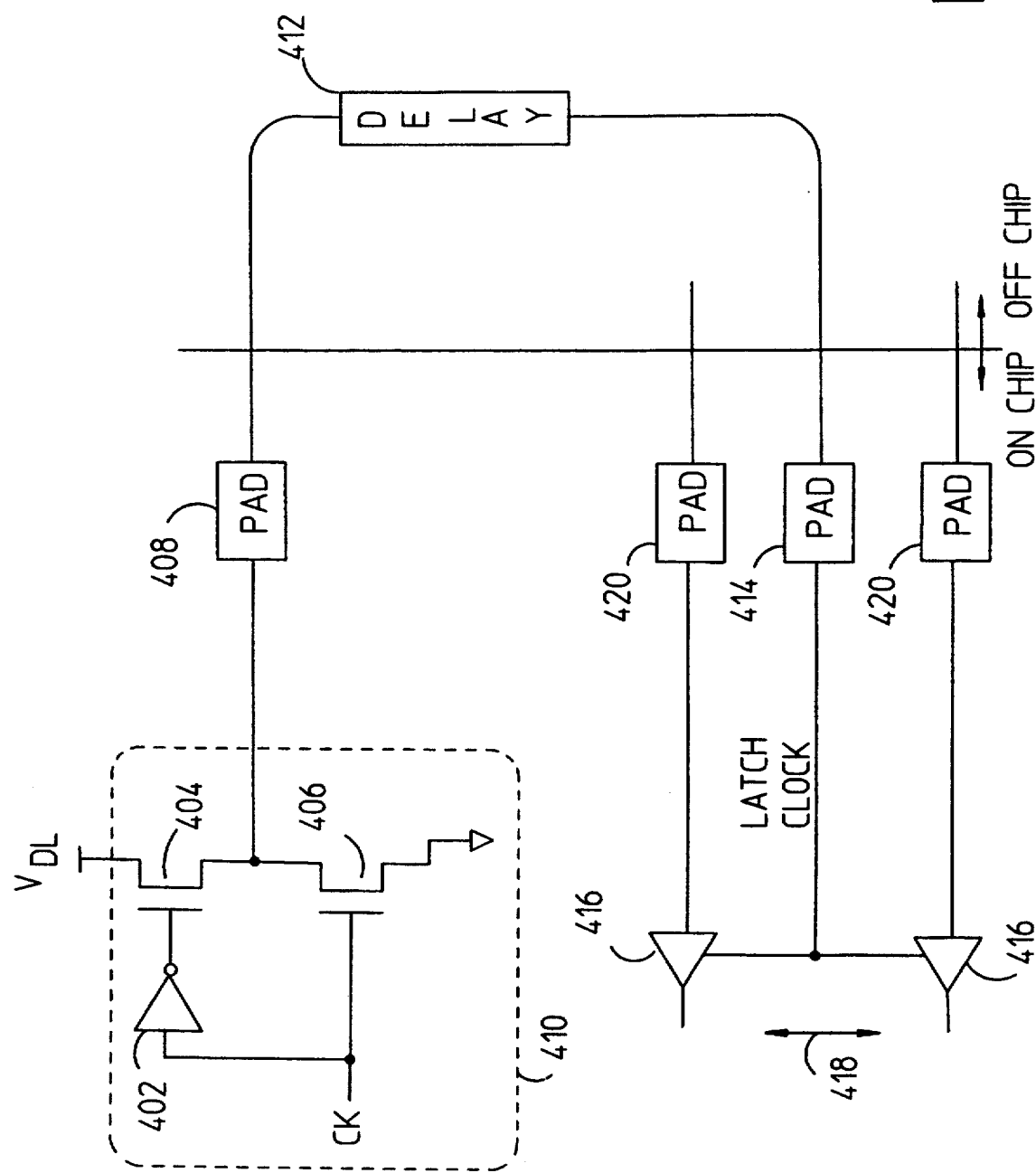
FIG. 4 shows a latch clock driver in conjunction with the present invention.

FIG. 3 is a diagram showing cache read timing for a latch clock signal 302 output from the low skew interface 250. The CPU's address set-up timing 306 and data set-up timing 308 are also depicted.

The latch clock 302 is generated using an internal CPU clock 304 (CK). The goal is to keep the amount of skew 324 of the latch clock to a minimum. This skew is the difference between the minimum and maximum time delay from CK rising and falling edge of the latch clock (e.g., SKEW=max latch clock delay−min latch clock delay).

In the present invention skew is minimized by: minimizing the number of invertor delays in the driver, because each stage may introduce a potential output variation; using an accurate off-chip delay; and directly distributing the clock to the receivers, because the RC delay of such a distribution will be smaller than the minimum or maximum variation introduced by a drive delay or buffer.

Driving an address causes data to change, and there are two main budgets to be considered during this transition. The budgets are shown below in Tables 1 and 2.

TABLE 1

| Timing Budget 1 | | | | |
|---|---|---|---|---|
| Maximum Address Drive | Access Time | Receiver Setup | Clock Skew | Minimum Latch Delay |
| 20ns ≧ 4.5ns + | 15.0ns + | 1.0ns + | 1.0ns − | 2.5ns |
| 20ns ≧ | 19.0ns (1.0ns margin) | | | |

TABLE 2

| Timing Budget 2 | | | |
|---|---|---|---|
| Minimum Address Drive | Data Hold Time | Receiver Hold Time | Maximum Latch Delay |
| 0ns ≦ 1.5ns + | 4.0ns − | 0.5ns − | 4.0ns |
| 0ns ≦ | 1.0ns (1.0ns margin) | | |

The first budget to be considered is whether the data is going to show up too late to be latched? In other words, in the case when the system is running slow, is the latch clock fir enough away from the address change so that the system can successfully latch the data that corresponds to that address change? If the address change takes a long period of time, and if the SRAM takes its full access time, the first budget must maintain that the latch clock is out far enough in the beginning of the second cycle so that there is sufficient time to latch the data.

The two edges of the timing diagram that delimit the bounds of the first timing budget are the first rising edge of CK (see 312) and the second filling edge of the latch clock (see 314). This is because on CK rising, a new address is driven, and on the second filling latch clock the data corresponding to that address will be latched.

As shown in Table 1, the total amount of time permitted to complete the latch is: the CK rising to CK rising (see 310; note the 20.0 ns clock cycle time on the left hand side of the equation); plus the minimum latch clock delay 316 (this is shown by placing a negative 2.5 ns on the right hand side of the equation).

This total budget (22.5 ns) is then compared to the time it takes to complete the necessary events to latch the data. The first factor in latching the data is a maximum address drive time 318. The maximum address drive time 318 is the time from CK rising until all the address lines are valid at all the SRAMs. The maximum address drive time 318 is approximately 4.5 ns.

To be added to the maximum address drive time 318 is a maximum access time 320. Access time is measured from the time the address becomes stable to when all the data lines become stable. The maximum access time 320 is the time taken by the SRAMs to drive valid data back to the inputs of the chip, (e.g., the maximum address drive time is when the last address line becomes stable). The maximum access time 320 is approximately 15.0 ns.

A period called the receiver setup time 322 is also added. The receiver setup time 322 is the shortest time that the data can be at the inputs before the latch clock falls (e.g., 1.0 ns).

Finally, a value representing a clock skew 324 is added. The clock skew value represents the potential variation in the length of a clock cycle due to many factors, such as jitter in the inputs to the CPU's clock buffer, cycle-to-cycle clock loading variations, etc. (The difference between the minimum latch clock delay 316 and a maximum latch clock delay 326 is taken into account by using the maximum delay in the budget in Table 1 and the minimum delay in the budget shown in Table 2.) The time required by these four events minus the minimum latch delay time 316 equals 19.0 ns. This leaves a margin of 1 ns.

The second budget is the race condition when the address has changed to assure that the old data is latched. Referring to Table 2, the left hand side of the equation is zero, because all of the events are triggered off the rising edge of CK. The events in the race condition are broken down into two groups: the address/hold events and the race events.

The sum of the minimum address drive time 328 (which starts when any of the address lines can begin to change; e.g., 1.5 ns), and the SRAM data hold time 340 (e.g., 4 ns) is the earliest possible time after that rising CK that data can change.

The race events are the receiver hold time and the maximum latch clock delay 326 (e.g., 4.0 ns). The hold time is the additional time that the data must be held valid at the inputs receiver after the latch clock goes low to guarantee the latching of the correct data; e.g., 0.5 ns.

The two competing events are the earliest possible time after that rising CK that data can change, and the latest that the receiver can be shut off. The budget must guarantee that the receiver is shut off before the earliest time the data can change. The race budget margin is also 1.0 ns. The margin of 1.0 ns represents the condition in which the receiver has been shut off 1.0 ns before the data at its inputs has changed.

A minimum latch delay of 2.5 ns in the budget represents a minimum intrinsic driver delay of 0.5 ns plus a 2.0 ns off-chip time delay. Similarly, a maximum latch clock delay of 4.0 ns represents a maximum intrinsic driver delay of 2.0 ns plus the 2.0 ns off-chip time delay. Due to the inversion in the driver, for each edge of the CK 304 there will be an opposite edge on the latch clock 302.

Details of the latch clock interface 250 will now be described with reference to FIG's. 4 and 5. Each of the latch drivers 230–236 comprises an invertor 402, a pull-up field effect transistor (FET) 404, a pull-down FET 406 and an output pad 408, all located on an ASIC chip (e.g., the CPU's VLSI chip). The CPU's internal clock CK is input to the invertor 402. The output of the invertor 402 is in turn used to control the gate of the FET 404. CK is also used to directly control the gate of the FET 406.

When CK cycles to a high logic level (a positive voltage) the invertor will switch to a low logic level to thereby turn off the pull-up FET 404, and the pull-down FET 406 will be rendered conductive to pull-down the voltage of the output pad 408 to a low logic level (e.g., ground, for example).

When CK cycles low the pull-down FET 406 is turned off, and the pull-up FET 404 is turned on because the invertor's output switches high, thereby pulling-up the output pad 408 to a high logic level (the voltage of $V_{DL}$; 3.3 volts DC, for example).

The latch clock signal is transferred off-chip to a discrete delay element 412. The delay element 412 delays the latch clock signal, as discussed above, for a period of 2.0 ns, for example. The delay element 412 may comprise a PC board trace, a discrete element including resistance, capacitance and/or inductance, a discrete delay line element or a length of coaxial cable. Discrete delay line elements with various time delays are available from Thinfilm Technology Corp. as single in-line packages.

The latch clock signal is then sent back on-chip to a receiver pad 414 and is distributed to a plurality of receivers 416, as shown by the arrow 418.

Each receiver 416 is essentially a transparent latch. An equivalent off-the-shelf transparent latch is a TTL 7475, and is available from many manufacturers, such as Texas Instruments. Information present at a data input pads 420 of the receivers is transferred to the data output of the receivers when the enable (clock latch signal) is high, and the output will follow the input while the clock latch is high. When the clock latch goes low the information that was present at the data input at the time the transition occurred will be retained at the output until the clock latch is permitted to go high.

Figure 5:
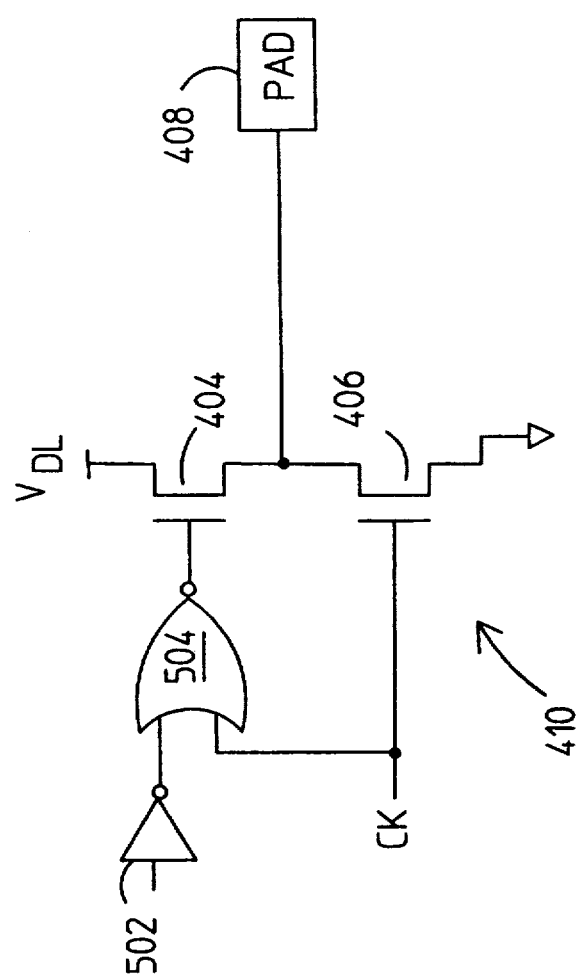
FIG. 5 shows an alternate embodiment of a latch clock driver in conjunction with the present invention.

Alternatively, as shown at FIG. 5, the latch clock driver 410 may comprise an invertor 502 and a NOR gate 504 to eliminate possible chip clock race conditions caused by the distribution of CK and $\overline{CK}$ around the chip (i.e., CK1 and CK2). The NOR gate has CK as one of its inputs and $\overline{CK}$ fed through the invertor to the other input. The output of the NOR gate controls the gate of the pull-up FET. The pull-down FET's gate is directly controlled by CK.

Distributing the clock to more receivers will increase both capacitance and resistance on the clock line. This results in a greater RC delay which is one component of the skew. The receiver that is closest to the clock input sees virtually no RC delay, which the most distant receiver sees the entire RC delay. Multiple latch clock drivers including identical delays may be used to assure proper latching of data at the receivers. Alternatively, once the latch clock is brought back onto the chip, it can be buffered using conventional invertor gain stages.

Figure 6:
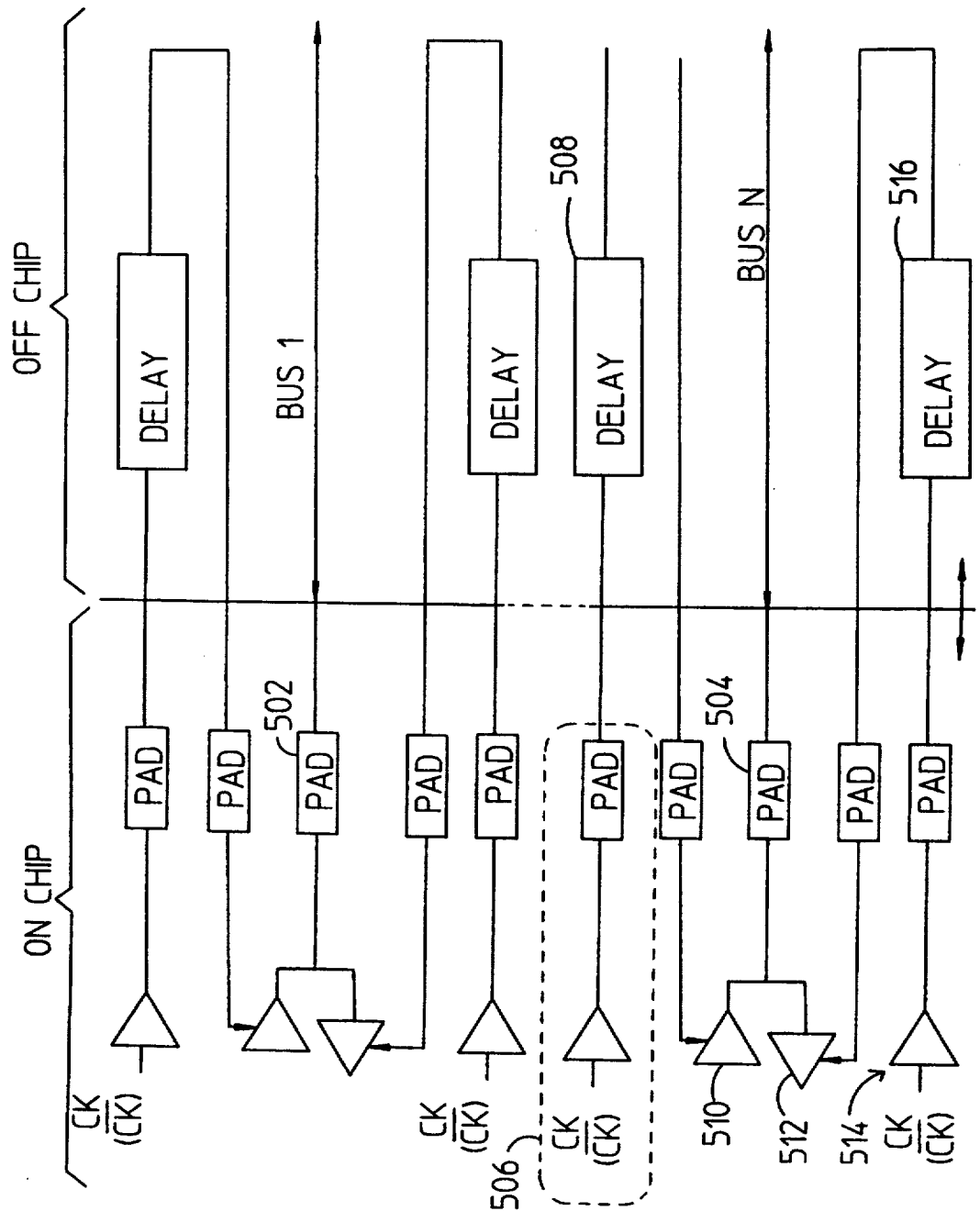
FIG. 6 shows a further embodiment of the present invention in which various ASICs transmit and receive data over a plurality of buses.

Separate delays for drivers and receivers, and separate delays for different buses are also possible. As shown in FIG. 6, different latch clocks can be generated for groups of receivers connected to separate buses. FIG. 6 shows an arbitrary number of bidirectional buses 1 through N connected to a plurality of receiver/driver pads 502 through 504, respectively.

A first latch clock driver 506 and its associated pad are interconnected with a delay element 508 to qualify information being transferred to the bus N via a driver 510 and the pad 504. Similarly, information to be transferred from the bus N to a receiver 512 is qualified by the latch clock driver 514 and a delay element 516. Note that the latch clock and the drive clock drivers and the receiver/drivers are located on a chip, and the separate delay elements are located off-chip.

Many latching functions can be achieved by choosing a phase of the on-chip clock that is appropriate for the desired task, and then tuning the off-chip delay to position the latch clock.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents. It will be understood by those skilled in the art that various changes in form and detail may be made therein without departing from the spirit and scope of the invention.

Having thus described our invention, what we claim as new and desire to secure by Letters Patent is:

1. An interface system for enabling an ASIC chip's drivers and receivers to qualify information communicated on one or more buses such that skew is minimized, the ASIC chip having an internal clock, the interface comprising:

driver means located on the ASIC chip for generating a clock signal with a phase different from the phase of the internal clock and routing said clock signal off-chip into a delay element; and delay means located off the chip for delaying said clock signal using said delay element to thereby generate a qualifying clock signal and routing said qualifying clock signal back on-chip to qualify information being driven to or information being latched from the one or more buses.

2. A system according to claim 1, wherein said qualifying clock signal is used to enable at least one on-chip receiver to latch information from the one or more buses into the chip.

3. A system according to claim 1, wherein said qualifying clock signal is used to enable at least one on-chip driver to transfer information from the ASIC chip to the one or more buses.

4. A system according to claim 2, further comprising:

further driver means for generating a plurality of clock signals each with a phase different from the phase of the internal clock and routing said plurality of clock signals off-chip into a plurality of delay elements; and further delay means for delaying said plurality of clock signals using said delay elements to thereby generate a plurality of latch clock signals and routing said plurality of latch clock signals back on-chip to a plurality of on-chip receivers to transfer information from the one or more buses to the ASIC chip.

5. A system according to claim 3, further comprising;

further driver means for generating a plurality of clock signals each with a phase different from the phase of the internal clock and routing said plurality of clock signals off-chip into a plurality of delay elements; and further delay means for delaying said plurality of clock signals using said delay elements to thereby generate a plurality of drive clock signals and routing said plurality of drive clock signals back on-chip to a plurality of on-chip drivers to transfer information from the ASIC chip to the one or more buses.

6. A system according to claim 2, further comprising:

a further driver means for generating a further of clock signal with a phase different from the phase of the internal clock and routing said further clock signal off-chip into a further delay element; and a further delay means for delaying said further clock signal using said further delay element to thereby generate a further qualifying clock signal and routing said further qualifying clock signal to one of a further receiver on another chip to transfer information from the one or more buses to said another chip, or a further driver on said another chip to transfer information from said another chip to the one or more buses.

7. A method for interfacing ASIC chips, each having an internal clock, such that skew is minimized, comprising the steps of:

generating a clock signal on an ASIC chip with a phase different from the phase of the ASIC chip's internal clock;

routing said clock signal off-chip into a delay element located off the ASIC chip;

delaying said clock signal using said delay element to thereby generate a qualifying clock signal; and routing said qualifying clock signal back on-chip to qualify information being driven to or information being latched from the one or more buses.

8. A method according to claim 7, wherein said qualifying clock signal is used to enable at least one on-chip receiver to latch information from the one or more buses into the ASIC chip.

9. A method according to claim 7, wherein said qualifying clock signal is used to enable at least one on-chip driver to transfer information from the ASIC chip to the one or more buses.

10. A method according to claim 8, further comprising the steps of:

generating a plurality of clock signals each with a phase different from the phase of the internal clock;

routing said plurality of clock signals off-chip into a plurality of delay elements, respectively;

delaying said plurality of clock signals using said delay elements to thereby generate a plurality of latch clock signals; and routing said plurality of latch clock signals back on-chip to a plurality of on-chip receivers to transfer information from the one or more buses to the ASIC chip.

11. A method according to claim 9, further comprising the steps of:

generating a plurality of clock signals each with a phase different from the phase of the internal clock;

routing said plurality of clock signals off-chip into a plurality of delay elements, respectively;

delaying said plurality of clock signals using said delay elements to thereby generate a plurality of drive clock signals; and routing said plurality of drive clock signals back on-chip to a plurality of on-chip drivers to transfer information from the ASIC chip to the one or more buses.

12. A method according to claim 8, further comprising the steps of:

generating a plurality of clock signals each with a phase different from the phase of the internal clock;

routing said plurality of clock signals off-chip into a plurality of delay elements, respectively;

delaying said plurality of clock signals using said delay elements to thereby generate a plurality of latch clock signals; and routing said plurality of latch clock signals to a plurality of receivers on a further chip to transfer information from the one or more buses to the further chip.

13. A method according to claim 9, further comprising the steps of:

generating a plurality of clock signals each with a phase different from the phase of the internal clock;

routing said plurality of clock signals off-chip into a plurality of delay elements, respectively;

delaying said plurality of clock signals using said delay elements to thereby generate a plurality of drive clock signals; and routing said plurality of drive clock signals to a plurality of further drivers on a further chip to transfer information from the further chip to the one or more buses.

14. An interface system for enabling an ASIC chip's drivers and receivers located on the ASIC chip to qualify information communicated on one or more buses such that skew is minimized, the ASIC chip having an internal clock, the system comprising:

a driver circuit connected to the internal clock and located on the ASIC chip for generating a clock signal with a phase different from the phase of the internal clock;

a delay element located off the ASIC chip and connected to said driver circuit for delaying said clock signal thereby generating at least one of a drive clock signal and a latch clock signal; and means for conducting said drive clock signal to the drivers located on the ASIC chip to transfer information from the ASIC chip to the one or more buses, or for conducting said latch clock signal to the receivers located on the ASIC chip to transfer information from the one ore more buses to the chip.

15. A system according to claim 14, wherein said driver circuit comprises:

an output pad for transferring said clock signal to said delay element;

an invertor for inverting the internal clock;

a first transistor, controlled by the output of said invertor, for connecting said pad to a first voltage level when the internal clock in a first logic state; and a second transistor, controlled by the internal clock, for connecting said pad to a second voltage level when the internal clock in a second logic state.

16. A system according to claim 14, wherein said system further includes:

a plurality of driver circuits connected to the internal clock for generating a plurality of clock signals each with a phase different from the phase of the internal clock;

a plurality of delay elements located off the chip, each connected to one of said plurality of driver circuits for delaying said respective clock signal thereby generating a plurality of drive or latch clock signals; and further means for conducting said drive clock signals to the drivers located on the ASIC chip to transfer information from the chip to the one or more buses, or for conducting said latch clock signals to the receivers located on the ASIC chip to transfer information from the one or more buses to the chip.

17. A system according to claim 14, wherein said system further includes:

a further driver circuit connected to the internal clock for generating a further clock signal with a phase different from the phase of the internal clock;

a further delay element located off the chip and connected to said further driver circuit for delaying said further clock signal thereby generating a further drive or a further latch clock signal; and further means for conducting said drive clock signal to further drivers located on another chip to transfer information from said another chip to the one or more buses, or for conducting said further latch clock signal to further receivers on said another chip to transfer information from the one or more buses to said another chip.

18. A system according to claim 15, wherein said delay element comprises a metal trace which forms a wire on a printed circuit board.

19. A system according to claim 15, wherein said delay element comprises an electrical component having a first terminal, a second terminal, and means for connecting said first terminal to said second terminal such that a signal input to said first terminal is delayed by a predetermined amount of time before appearing at said second terminal.

* * * * *

UNITED STATES PATENT AND TRADEMARK OFFICE
CERTIFICATE OF CORRECTION

PATENT NO. : 5,416,918
DATED : May 16, 1995
INVENTOR(S) : Craig A. Gleason, et al.

It is certified that error appears in the above-indentified patent and that said Letters Patent is hereby corrected as shown below:

Claim 14, Column 10, line 21, "ore" should read --or--.

Claim 15, Column 10, line 31, insert --is-- after "clock"; and
line 35, insert --is-- after "clock".

Signed and Sealed this

Second Day of November, 1999

Attest:

Attesting Officer

Q. TODD DICKINSON

Acting Commissioner of Patents and Trademarks